US008694716B2

(12) United States Patent
Bildgen et al.

(10) Patent No.: US 8,694,716 B2
(45) Date of Patent: Apr. 8, 2014

(54) METHOD FOR WRITING AND READING DATA IN AN ELECTRICALLY ERASABLE AND PROGRAMMABLE NONVOLATILE MEMORY

(75) Inventors: Marco Bildgen, Habere Poche (FR); Juergen Boehler, Munich (DE)

(73) Assignees: STMicroelectronics International N.V., Amsterdam (NL); STMicroelectronics Design and Application GmbH, Grassbrunn (DE)

( * ) Notice: Subject to any disclaimer, the term of this patent is extended or adjusted under 35 U.S.C. 154(b) by 777 days.

(21) Appl. No.: 12/604,175

(22) Filed: Oct. 22, 2009

(65) Prior Publication Data

US 2010/0106896 A1 Apr. 29, 2010

(30) Foreign Application Priority Data

Oct. 23, 2008 (EP) .................................... 08358013

(51) Int. Cl.
*G06F 12/00* (2006.01)

(52) U.S. Cl.
USPC ............. 711/103; 711/E21.001; 711/E12.008

(58) Field of Classification Search
USPC ........................... 711/103, E12.001, E12.008
See application file for complete search history.

(56) References Cited

U.S. PATENT DOCUMENTS

| 5,586,291 | A | 12/1996 | Lasker et al. |
| 6,373,747 | B1 | 4/2002 | Harari et al. |
| 2003/0046482 | A1 | 3/2003 | Venkiteswaran |
| 2004/0114431 | A1* | 6/2004 | Shona ...................... 365/185.11 |
| 2005/0251643 | A1 | 11/2005 | Dirscherl et al. |

FOREIGN PATENT DOCUMENTS

| EP | 1510924 | * | 2/2005 |
| EP | 1510924 A1 | | 3/2005 |

\* cited by examiner

*Primary Examiner* — Mardochee Chery
(74) *Attorney, Agent, or Firm* — Seed IP Law Group PLLC

(57) ABSTRACT

A method for writing and reading data in a main nonvolatile memory having target pages in which data are to be written and read, the method including providing a nonvolatile buffer having an erased area, providing a volatile cache memory, and receiving a write command to update a target page with updating data the length of which can be lower than the length of a page. The method also includes, in response to the write command, writing the updating data into the erased area of the nonvolatile buffer, together with management data of a first type, and recording an updated version of the target page in the cache memory or updating in the cache memory a previously updated version of the target page.

34 Claims, 13 Drawing Sheets

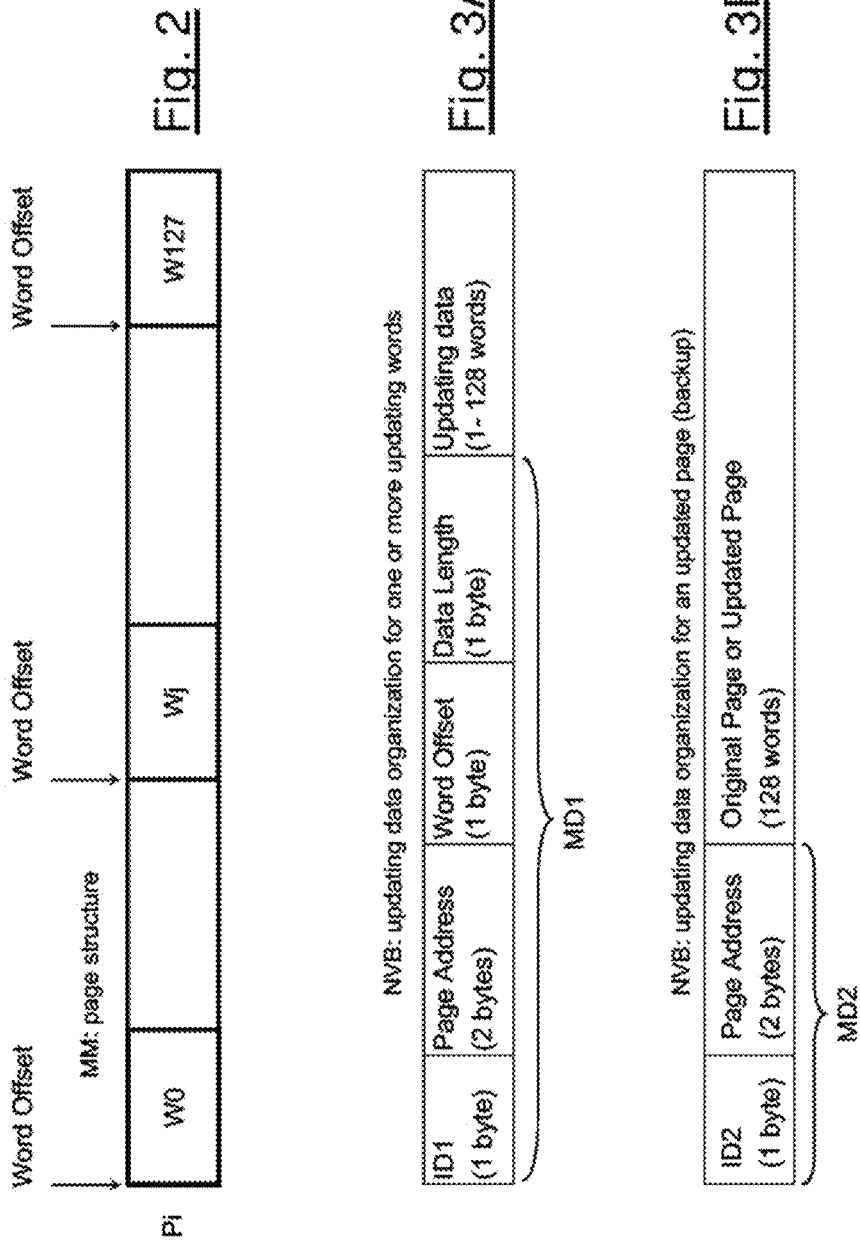

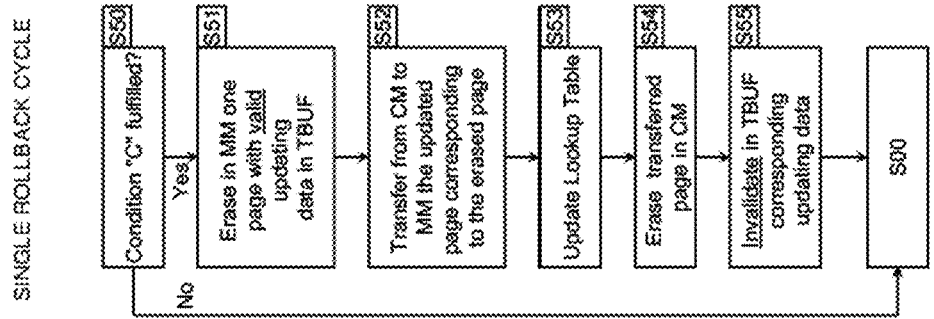
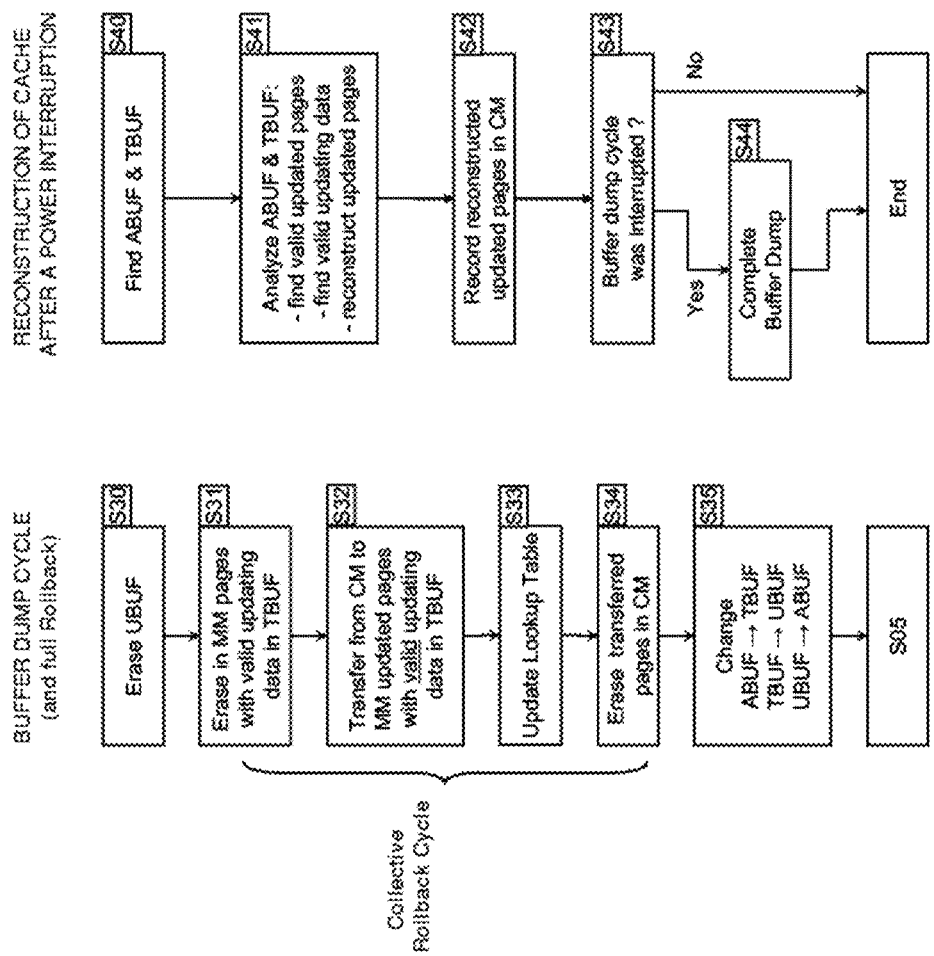

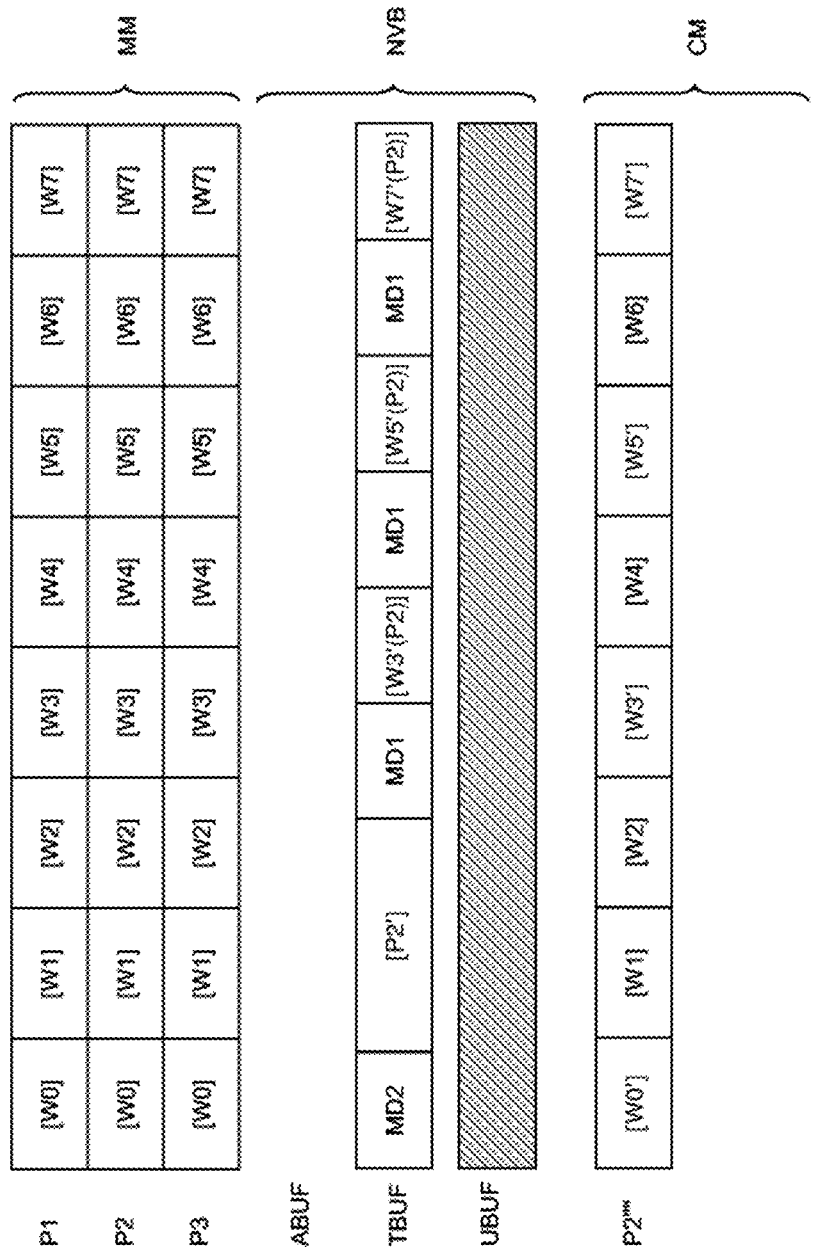

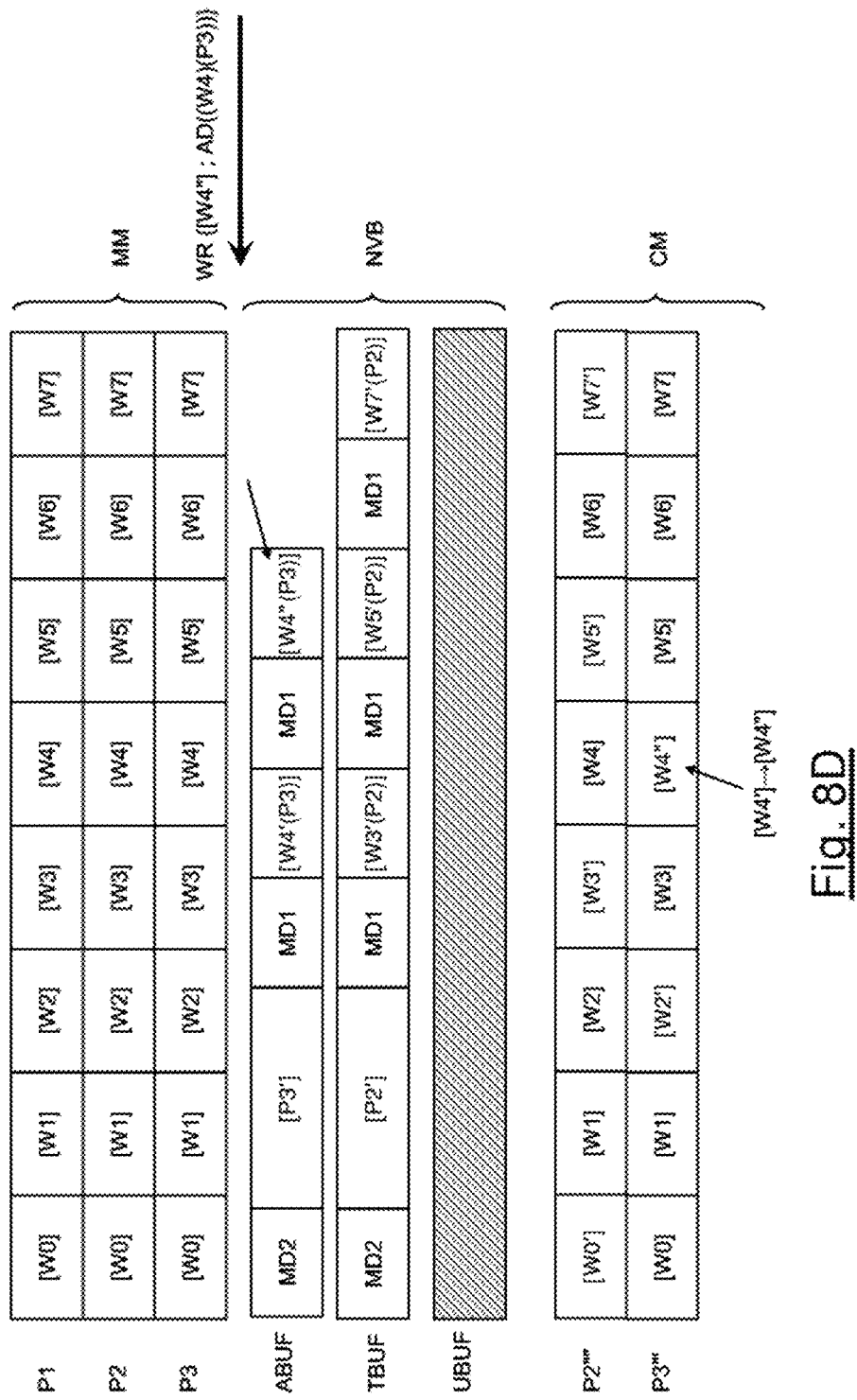

METHOD FOR WRITING AND READING DATA IN AN ELECTRICALLY ERASABLE AND PROGRAMMABLE NONVOLATILE MEMORY

BACKGROUND

1. Technical Field

The present disclosure relates to a method for writing and reading data in an electrically erasable and programmable nonvolatile memory such as an EEPROM memory or a Flash memory and, more particularly, to writing and reading data in an electrically erasable and programmable nonvolatile memory in order to protect the memory against the loss of data due to a power interruption.

2. Description of the Related Art

Conventionally, the recording of updating data in a target location of an electrically erasable and programmable nonvolatile memory involves a step of erasing the memory cells of the target location and then a step of writing all or part of these memory cells. The erase step allows for setting all the memory cells of the target location in an erased state corresponding to a first logic value which is defined by convention, for example "1". The write step, also called "programming", allows for setting certain memory cells in a programmed state corresponding, when the memory cells are read, to a second logic value, for example "0". Therefore, the write step is only applied to memory cells that must receive the second logic value and is always preceded by the erase step that is applied to all memory cells of the target location.

In a conventional electrically erasable and programmable nonvolatile memory, updating data that must be written in the memory are stored in a volatile buffer during the erasure of the target location. Therefore, a power interruption occurring either during the erasure of the target location or after the erasure of the target location and before updating data have been written in the memory results in an irretrievable loss of the initial data present in the target location and of the updating data present in the volatile buffer. The memory cells that contained the initial data are erased or are in an undetermined state, and the volatile memory has lost the updating data since it is no longer powered.

Now, some applications are such that the continuity of the power supply cannot be guaranteed. In particular, nonvolatile memories can be embedded in portable electronic devices such as chip cards and electronic tags that, due to portability and size constraints, do not include a power-supply source. For this reason, chip cards and electronic tags are typically powered by an external device such as a chip card reader when data are read from or written into their memory. This power supply can be interrupted at any moment, for example if the user suddenly tears a chip card from the slot in which it is inserted or tears a contactless card or a contactless tag from the magnetic field from which the power supply is extracted.

Consequently, the use of conventional electrically erasable and programmable nonvolatile memories in applications where there is a high risk of a power interruption makes the erase/write process unreliable.

Some recent developments have provided methods for writing such nonvolatile memories so as to prevent data loss during the erase/write process, in case of power interruption. These write methods are generally called "anti-tearing" methods because they aim to protect data against power interruption that are often caused by a tearing action by the user, in applications that have been mentioned above.

For example, it has been proposed to provide a backup memory location into which the initial page data are transferred before the target page location is erased. The page data are then updated and rewritten into the target page location and the backup location is erased.

Other known methods provide a pre-erased nonvolatile buffer into which the content of updated pages are written while the initial pages are kept in their initial states.

In particular, the U.S. Patent Publication No. 2004/0114431 discloses a Flash memory that includes a buffer divided into sectors. During a write operation, updating data to be written in a target sector in the Flash memory, as well as the address of the target sector, are written into an erased sector of the buffer. Erasure of buffer sectors following the sector that received the updating data and erasure of the target sector in the Flash memory is then performed using a rolling method that includes N steps of partial erasure.

In U.S. Patent Publication No. 2005/0251643, a main nonvolatile memory includes a further memory page and an address translation unit. The address translation unit maps logical addresses to physical addresses of the main nonvolatile memory or of the further memory page. During the write process, a new data element and the initial content of a page are written as updated page data into the further memory page, and then the initial page is erased. A counter is used to indicate which logical address includes the most-recently updated data. The updated page is then written into an erased area in the main memory, and the address translation unit re-maps the new physical address of the updated page to the previous logical address, and then the further memory page is erased.

In summary, conventional "anti-tearing" methods protect the initial page data or sector data present in the memory by allowing the updated page or sector data to be written in an erased location different from that of the target location without necessitating the prior erasure of the initial page or sector data. A correspondence table or address translation unit allows, when the target page or sector is to be read, the location of the most-recently updated page or sector data to be found.

However, some electrically erasable and programmable memories have a different "atomicity" with respect to, on the one hand, the smallest data element or "atomic unit of data" that can be individually written and, on the other hand, the smallest memory area that can be individually erased. For example, Flash memories generally differ from EEPROM memories in that they are generally page-erasable or sector-erasable whereas numerous EEPROM memories are word-erasable. Since a page generally contains a high number of words (a word is an X-bit data string with "X" depending upon the architecture of the memory), the writing of an updating word requires that the entire target page intended to receive the updating word be first completely erased.

Therefore, conventional "anti-tearing" methods require that updating data are first combined with other initial page data or sector data in order to obtain an updated version of the page or of the sector. The updated version of the page or of the sector is then written in an erased location different from that of the target page or target sector location. This means that a significant memory space is necessary to perform the "anti-tearing" write process. For example, in a page-erasable Flash memory wherein each page contains 256 words, writing a single word requires that a complete page location first be erased and then that a complete updated version of the page, including the updated word, be written. In addition, Flash memories have a limited number of write erase cycles that they can reliably perform, typically 100,000 cycles per page. If only one byte is being updated, the entire page must be cycled, resulting in a shorter lifespan.

BRIEF SUMMARY

One embodiment of the disclosure relates to a method for writing and reading data in a main nonvolatile memory that includes target pages in which data are to be written and read, the method including: providing a nonvolatile buffer having an erased area; providing a volatile cache memory; receiving a write command aiming to update a target page with updating data the length of which can be less than the length of a page, and, in response to the write command: writing the updating data into the erased area of the nonvolatile buffer, together with management data of a first type, and recording an updated version of the target page in the cache memory or updating in the cache memory a previous updated version of the target page.

According to one embodiment, the method includes receiving a page read command, and in response to the page read command: reading the updated version of the target page in the cache memory if the nonvolatile buffer contains updating data for the target page, or reading the target page in the main nonvolatile memory if the nonvolatile buffer does not contain updating data for the target page.

According to one embodiment, reading the updated version of the target page in the cache memory or reading the target page in the main nonvolatile memory is automatically selected using a hardware lookup table.

According to one embodiment, the management data of the first type includes at least one of: transaction data identifying a transaction in connection with which data are written in the memory; data identifying the management data of the first type; data indicating the location of the target page in the main nonvolatile memory; data indicating the location of the updating data in the target page; and data indicating the length of the updating data.

According to one embodiment, data identifying the management data of the first type or transaction data are written as a final step once updating data and other management data have been written into the nonvolatile buffer, as a validation of the recording of the updating data in the nonvolatile buffer.

According to one embodiment, data identifying the management data also comprise data for validating or invalidating the associated updating data.

According to one embodiment, the method includes a page rollback cycle that includes: erasing, in the main nonvolatile memory, at least one target page that includes updating data located in the nonvolatile buffer, and transferring an updated version of the at least one target page from the cache memory to the location of the at least one target page that has just been erased in the main nonvolatile memory.

According to one embodiment, the method includes a buffer dump cycle that includes: erasing at least one target page in the main nonvolatile memory; transferring an updated version of the target page from the cache memory to the location of the target page that has just been erased in the main nonvolatile memory; and erasing, in the nonvolatile buffer, updating data belonging to the transferred updated version of the target page.

According to one embodiment, the method includes, before erasing the target page in the main nonvolatile memory, a step of backing-up in the nonvolatile buffer an initial version or an updated version of the target page in order to save initial data of the target page for which no updating data have been written or are to be written in the nonvolatile buffer.

According to one embodiment, the method further includes in response to the write command: determining whether the erased area of the nonvolatile buffer is of a sufficient size to receive the updating data and the management data of the first type, then: if the erased area of the nonvolatile buffer is of a sufficient size, writing the updating data and the management data of the first type into the erased area of the nonvolatile buffer, and if the erased area of the nonvolatile buffer is not of a sufficient size, performing the buffer dump cycle.

According to one embodiment, the method includes, in response to the write command, a preliminary step of determining whether the nonvolatile buffer contains previous updating data for the target page, and if the nonvolatile buffer does not contain previous updating data for the target page: writing an updated version of the target page together with management data of a second type into the erased area of the nonvolatile buffer, instead of writing the updating data and the management data of the first type thereinto, and recording the updated version of the target page in the cache memory.

According to one embodiment, management data of the second type include at least one of: data identifying the management data of the second type, transaction data identifying a transaction in connection with which data are written in the memory, and data indicating the location of the target page in the main nonvolatile memory.

According to one embodiment, data identifying the management data of the second type or transaction data are written as a final step once the updated version of the target page has been written into the nonvolatile buffer, as a validation of the recording of the updated page in the nonvolatile buffer.

According to one embodiment, the method includes the step of providing within the nonvolatile buffer: an active buffer that includes an erased area, to write updating data and management data, a transfer buffer containing updating data and management data, and an unavailable buffer containing data to be erased.

According to one embodiment, the buffer dump cycle includes: erasing the unavailable buffer; erasing, in the main nonvolatile memory, target pages corresponding to valid updating data located in the transfer buffer; transferring, from the cache memory to the locations of the target page that have just been erased in the main nonvolatile memory, updated versions of the target pages; invalidating, in the transfer buffer, updating data belonging to the transferred updated versions of the target pages; declaring as transfer buffer the buffer that was previously the active buffer; declaring as unavailable buffer the buffer that was previously the transfer buffer, and declaring as active buffer the buffer that was previously the unavailable buffer and that has just been erased.

According to one embodiment, the method includes, in response to the write command, at least one preliminary step of determining whether the active buffer or the transfer buffer contains previous updating data of the target page, and if the active and transfer buffers do not contain previous updating data for the target page: writing an updated version of the target page into the active buffer, together with management data of a second type, recording the updated version of the target page in the cache memory, and: if the transfer buffer contains previous updating data for the target page: writing an updated version of the page into the active buffer, together with management data of a second type, invalidating previous updating data in the transfer buffer, and updating in the cache memory a previously-updated version of the target page; if the active buffer contains previous updating data for the target page: writing the updating data into the active buffer, together with management data of the first type, and updating in the cache memory a previously-updated version of the target page.

According to one embodiment, the method includes a single-rollback cycle that includes: erasing, in the main nonvolatile memory, one target page that includes valid updating data located in the transfer buffer; transferring, from the cache memory to the location of the target page that has just been erased, an updated version of the target page; and invalidating, in the transfer buffer, updating data belonging to the transferred updated version of the target page.

According to one embodiment, the method includes triggering the single-rollback cycle after updating data and managing data have been written in more than one physical page of the nonvolatile buffer.

According to one embodiment, a page is the smallest memory area of the main nonvolatile memory which can be erased individually.

According to one embodiment, the smallest updating data element which can be written in the main nonvolatile memory is an X-bit word, with "X" less than the number of bits in a page of the main memory.

In accordance with another aspect of the present disclosure, a method is provided that includes writing of updating data into an erased area of a nonvolatile buffer together with management data of a first type in response to a write command to update a target page; and recording an updated version of the target page in a cache memory if an updated version of the target page exists, otherwise updating in the cache memory a previously updated version of the target page.

In accordance with another aspect of the foregoing embodiment, the method includes backing up in the nonvolatile buffer an initial version or an updated version of the target page in order to save initial data of the target page for which no updating data have been written or are to be written in the nonvolatile buffer; erasing at least one target page stored in a main nonvolatile memory; transferring the updated version of the target page from the cache memory to the location of the target page erased in the previous step from the main nonvolatile memory; and erasing, in the nonvolatile buffer, updating data belonging to the transferred updated version of the target page.

In accordance with another aspect of the foregoing embodiment, in response to the write command: determining whether the erased area of the nonvolatile buffer is of a sufficient size to receive the updating data and the management data of the first type, then: if the erased area of the nonvolatile buffer is of a sufficient size, writing the updating data and the management data of the first type into the erased area of the nonvolatile buffer; and if the erased area of the nonvolatile buffer is not of a sufficient size, performing the buffer dump cycle.

In accordance with another aspect of the foregoing embodiment, in response to the write command, a preliminary step is provided of determining whether the nonvolatile buffer contains previous updating data for the target page, and if the nonvolatile buffer does not contain previous updating data for the target page: writing an updated version of the target page together with management data of a second type into the erased area of the nonvolatile buffer, instead of writing the updating data and the management data of the first type thereinto; and recording the updated version of the target page in the cache memory.

In accordance with another aspect of the foregoing embodiment, a buffer dump cycle is provided that includes erasing the unavailable buffer, erasing, in the main nonvolatile memory, target pages corresponding to valid updating data located in the transfer buffer, transferring, from the cache memory to the locations of the target page that have just been erased in the main nonvolatile memory, updated versions of the target pages, invalidating, in the transfer buffer, updating data belonging to the transferred updated versions of the target pages, declaring as a transfer buffer the buffer that was previously the active buffer, declaring as an unavailable buffer the buffer that was previously the transfer buffer, and declaring as an active buffer the buffer that was previously the unavailable buffer and that has just been erased.

In accordance with another aspect of the foregoing embodiment, in response to the write command, at least one preliminary step is provided of determining whether the active buffer or the transfer buffer contains previous updating data of the target page, and if the active and transfer buffers do not contain previous updating data for the target page: writing an updated version of the target page into the active buffer, together with management data of a second type, recording the updated version of the target page in the cache memory, and if the transfer buffer contains previous updating data for the target page: writing an updated version of the page into the active buffer, together with management data of a second type, invalidating previous updating data in the transfer buffer, and updating in the cache memory a previously-updated version of the target page, if the active buffer contains previous updating data for the target page: writing the updating data into the active buffer, together with management data of the first type, and updating in the cache memory a previously-updated version of the target page.

In accordance with another aspect of the foregoing embodiment, a single-rollback cycle is provided that includes erasing, in the main nonvolatile memory, one target page comprising valid updating data located in the transfer buffer, transferring, from the cache memory to the location of the target page that has just been erased, an updated version of the target page, and invalidating, in the transfer buffer, updating data belonging to the transferred updated version of the target page.

BRIEF DESCRIPTION OF THE SEVERAL VIEWS OF THE DRAWINGS

Embodiments of the present disclosure will be described in the following description in connection with, but not limited to, the appended figures in which:

FIG. 2 shows an example architecture of a page in a main nonvolatile memory of the memory device;

FIG. 3A shows a first example of updating data in a nonvolatile buffer of the memory device;

FIG. 3B shows a second example of updating data in the nonvolatile buffer of the memory device;

FIG. 5 is a flowchart describing a buffer dump cycle represented as a block in FIG. 4;

FIG. 6 is a flowchart describing operations performed after a power interruption;

FIG. 7 is a flowchart describing an optional rollback cycle represented as a block in dotted lines in FIG. 4.

DETAILED DESCRIPTION

Figure 1:
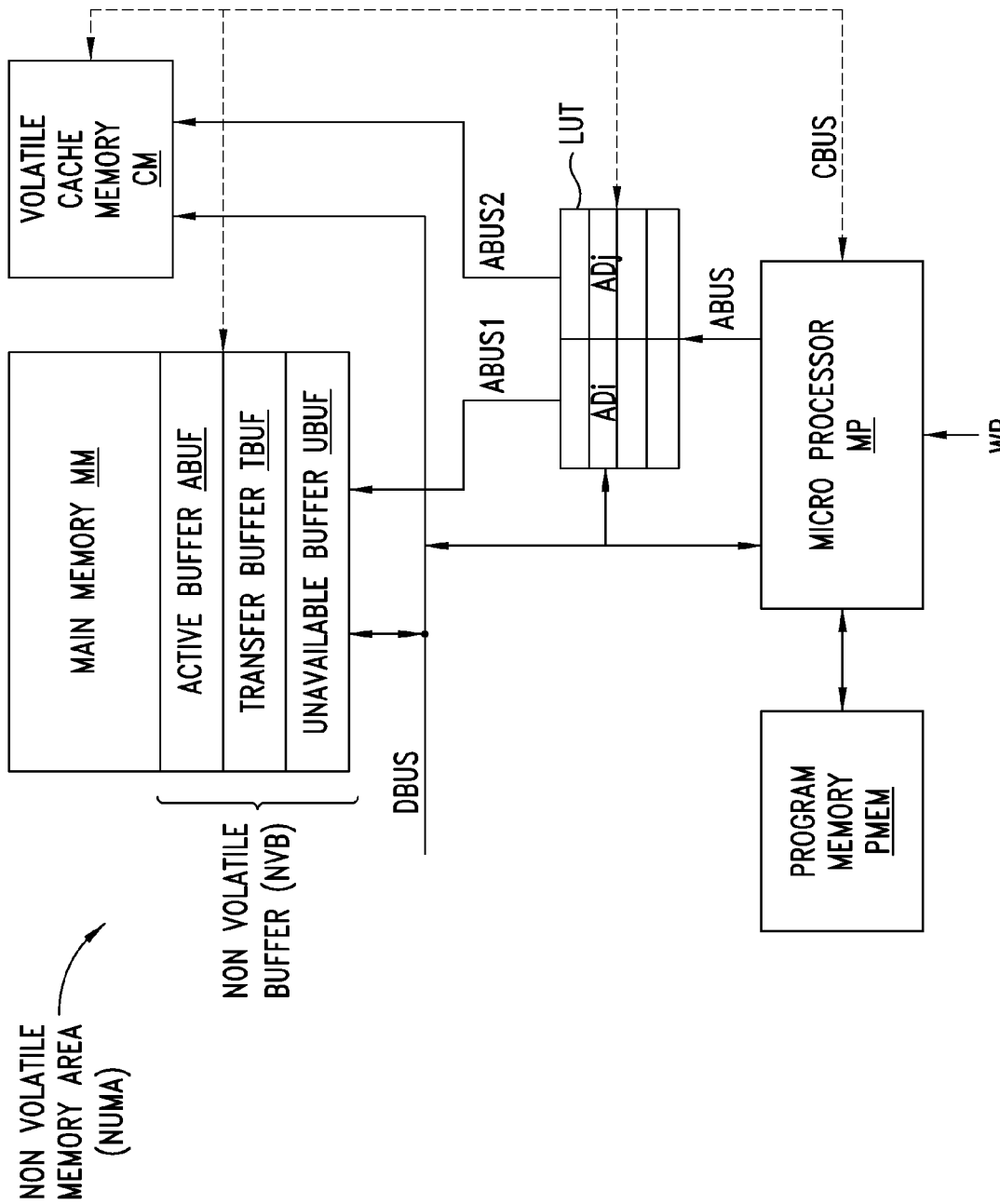
FIG. 1 shows in block form an embodiment of a memory device according to the disclosure.

FIG. 1 shows schematically, in block form, an embodiment of a memory device according to the present disclosure. The memory device includes a main nonvolatile memory MM, a nonvolatile buffer NVB and a microprocessor MP. The microprocessor has a program memory PMEM in which a program has been loaded for executing an embodiment of the method for reading and writing data according to the disclosure.

The main memory MM is for example a page-erasable and word-writable Flash memory. Therefore, it includes target pages that are individually erasable and in which X-bit words can be individually written by programming memory cells.

In this embodiment, the nonvolatile buffer NVB and the main memory MM are parts of a nonvolatile memory area NVMA and are read or written using common decoders and sense amplifiers (not shown). The memory area NVMA is linked to the microprocessor through a data bus DBUS, an address bus ABUS and a control bus CBUS. The control bus includes various control signals allowing the microprocessor MP to control and to apply read and write commands to these different elements.

The nonvolatile buffer NVB has an erased area into which the microprocessor writes updating data, in response to a write command containing such updating data and pointing to a target page of the main memory. The updating data are written in the nonvolatile buffer NVB without erasing the corresponding target page in the main memory. In this manner, if a power interruption occurs, there is no loss of data—neither the initial data nor the updating data. The erasure of the initial data and the replacement of the initial data in the main memory are performed later during a buffer dump cycle, an example embodiment of which will be described later.

In addition, in response to a write command containing updating data representing fragments of the target page, the microprocessor writes only the updating data in the nonvolatile buffer NVB instead of writing the full updated page, unless in certain circumstances that will be described below.

The memory device also includes a volatile memory cache CM, for example a RAM cache (Random Access Memory), also linked to the microprocessor through the data bus DBUS, the address bus ABUS and the control bus CBUS. The volatile cache CM is provided to store updated versions of target pages of the main memory MM. In this manner, when a complete page must be read, the updated content of the page is available in the cache and the writing of updating data representing page fragments in the nonvolatile buffer does not increase the time required to read an updated page. In other words, it is not necessary for the microprocessor to rebuild the updated page from the different fragments present in the nonvolatile buffer, which would require selecting and reading different page locations.

To simplify the cache CM access and to save microprocessor processing time, a lookup table LUT is also provided. The address bus ABUS links the microprocessor to an input of the lookup table LUT and splits into two buses ABUS1, ABUS2 at the output of the lookup table. An address input of the memory area NVMA is connected to the bus ABUS1 and an address input of the cache CM is connected to the bus ABUS2. The microprocessor stores a list of address pairs ADi/ADj in the lookup table, and updates it from time-to-time by erasing, changing, or adding address pairs. The microprocessor also activates the lookup table during the execution of read commands received from the outside and pointing to the main memory MM.

When activated, the lookup table behaves like an address multiplexer for addresses ADi present on the bus ABUS when a corresponding address ADj exists in the lookup table. In this case, the lookup table outputs the corresponding address ADj on ABUS2 instead of outputting address ADi on ABUS1, so that the microprocessor reads the cache memory at address ADj instead of reading the main memory at address ADi. Control logic (not shown) is also provided to transform command signals issued by the microprocessor to the main memory (for example "CHIP SELECT" and "READ") into command signals applied to the cache memory when an address ADj exists in the lookup table in relation to the address ADi present on the bus ABUS. Since the use of a lookup table is per se within the purview of the skilled person, the lookup table and associated circuitry will not be further described, and the embodiment shown in FIG. 1 only represents one of several embodiments that can be provided by the skilled person. In particular, the lookup table may be implemented in different conventional ways. For example, in an alternative embodiment, the LUT may have a single output controlling the address input of the nonvolatile memory array NVMA and the address input of the cache memory CM in a contiguous memory space, i.e., through a single address bus "ABUS12", instead of two buses ABUS1, ABUS2. In addition, it will be noted that the provision of a lookup table is optional and merely aims to save microprocessor processing time.

FIG. 2 shows an example of the page structure of main memory MM and FIG. 3A shows the organization of the updating data in the nonvolatile buffer NVB. As shown in FIG. 2, a page conventionally contains data words, each containing X-bits with X depending upon the architecture of the memory, for example 128 words from W0 to W127. Each word has an address that includes the page address (MSB address) and the word address in the page (LSB address), also called the "word offset". This word offset can range from 0 to 127 for a 128-word page. Thus, for a 128-word page, 7 bits are necessary to define the word offset of a data word.

In the example shown in FIG. 3A, it is assumed that the smallest updating data that can be written in the buffer is an 8-bit word, i.e., a byte. When updating data are to be written in the buffer, the microprocessor writes in single file management data MD1 of a first type and the updating data which may include from 1 to 128 words for a 128-word page memory. The management data MD1 includes for example the following data fields:

an identification field ID1 identifying the management data of the first type MD1 (and therefore indicating that updating data follow in the buffer), for example a 1-byte field;

a page address indicating the address of the target page to which the updating data belong, for example a 2 byte field (which means in this example that the main 30 memory can have up to 65536 pages and has a size of 8 MB if each page contains 128 bytes);

a word offset address indicating the address in the target page of the first word of the updating data, for example a 1-byte field (in which 7 bits only are used to define the word offset address, if the page size is equal to 128 words); and a data length field indicating the number of words that follow, for example a 1-byte field.

The nonvolatile buffer NVB is progressively filled with updating data in the format shown in FIG. 3A, until a decision is made to empty it. At this time, as will seen later by means of examples, the buffer dump cycle is performed. Basically, such a dump cycle includes firstly a page(s) rollback cycle and then an erase step of the areas of the nonvolatile buffer that have been "rolledback" into the main memory. The rollback cycle includes for example a step of erasing at least one target page in the main memory MM and a step of transferring an updated version of this page into the erased location.

Since embodiments of the present disclosure also aim to prevent data loss after a power supply failure, it can be noted that such a rollback cycle creates a risk of data loss if a power interruption occurs between the erasure of the target page and the transfer of its updated version. This is due to the fact that the updating data in the nonvolatile buffer do not necessarily represent all the data of the target page some initial data of the target page can still be valid when the rollback cycle is performed. For this reason, at least one backup step of the initial page data is provided in order to save at least the initial page data for which no updating data have been written or are to be written in the nonvolatile buffer. To that effect, in some embodiments of the disclosure, the nonvolatile buffer NVB is also used as a "backup area" to store the content of the initial page data before they are erased during the rollback cycle. More particularly, two embodiments can be provided:

- the initial page data are backed-up (i.e., saved) in the buffer just before it is erased, after updating data for this page have been written in the buffer; or
- the initial page data are backed-up in the buffer ab initio, that is to say when updating data for this page are received for the first time.

In the second embodiment, it is advantageous to update the page before it is written in the buffer instead of writing the initial page data and then writing the updating data in the buffer, because this allows for saving memory space. Since the aim of this backup step is to save the initial page data for which no updating data have been written in the nonvolatile buffer when the rollback cycle is performed, backing-up an updated version of the page is sufficient to save these initial data. This embodiment of the page backup step will be used in an embodiment if the disclosure described below in relation with FIG. 4.

FIG. 3B shows the organization of the backing-up of a page in the nonvolatile buffer NVB. When page data (previously updated or not) are to be written in the buffer, the microprocessor writes in single file managing data MD2 of a second type and the page data, which includes 128 words according to the page structure shown in FIG. 2. The management data MD2 includes for example the following data fields:

- an identification field ID2 identifying the management data of the second type MD2 (and therefore indicating that backed-up page data—initial or updated—follows in the buffer), for example a 1-byte field; and
- a page address indicating the address of the page, for example a 2-byte field.

In one embodiment, fields ID1 and ID2 include validation and invalidation bits that allow the microprocessor to invalidate updating data or backed-up pages when necessary. In other embodiments, fields ID1 and ID2 may also include transaction bits to include the reference of a transaction during which the updating data were written in the memory. This feature can be useful in applications of the memory device such as chip-card applications where updating data can be associated with a transaction identifier. A "transaction" commonly designates a session between a chip card and a terminal (card reader, payment terminal, . . . ) during which data are written in the non volatile memory area MVMA. Therefore, if transaction bits are used, any modification of the data in the memory is "labeled" with a corresponding transaction number.

Preferably, when updating data are written in the buffer or when a page is backed-up in the buffer, the management data MD1 or MD2 or at least the identification field ID1 or ID2 of the management data are written as a final step after the updating data or the backed-up page have been written in the buffer. Also, if transaction bits are used, such transaction bits are also written as a final step, as a "commitment" of the terminal which performs the transaction, i.e., the fact that the terminal confirms that an agreed transaction was performed and that the modification of the data in the non volatile memory is legitimate. In this manner, if a power interruption occurs before all updating data of the page are written, the absence of the ID1 or ID2 field and/or of the transaction bits indicates that the data written before the power interruption are not valid.

Embodiments of the present disclosure also include a method to ensure that the nonvolatile buffer NVB continuously has an erased area available to write updating data or to backup page data (priorly updated or not). To implement this method, the buffer includes at least three different sectors, namely an "active buffer" ABUF, a "transfer buffer" TBUF, and an "unavailable buffer" UBUF as shown in FIG. 1. The active buffer ABUF is the erased area of the buffer provided to receive updating data (FIG. 3A), page data (FIG. 3B) and management data (FIGS. 3A, 2B). The transfer buffer TBUF includes updating data which are to be transferred into target pages of the main memory. The unavailable buffer UBUF includes data which has already been transferred in the main memory and that are therefore to be erased.

The active buffer ABUF is progressively filled with page data, updating data and management data until a decision is made to empty the active buffer. This decision is made for example when it does not offer enough erased area to write updating data and their accompanying management data (or to backup a page, priorly updated or not). If this condition is met, the previously-mentioned buffer dump cycle is performed. Due to the 3-sector structure of the nonvolatile buffer in this embodiment, the buffer dump cycle here includes a step of erasing the unavailable buffer UBUF, a collective rollback cycle concerning all valid updating data in the transfer buffer TBUF, and a step of rotating the three sectors of the buffer, so that the erased unavailable buffer UBUF becomes the active buffer ABUF.

Figure 4:
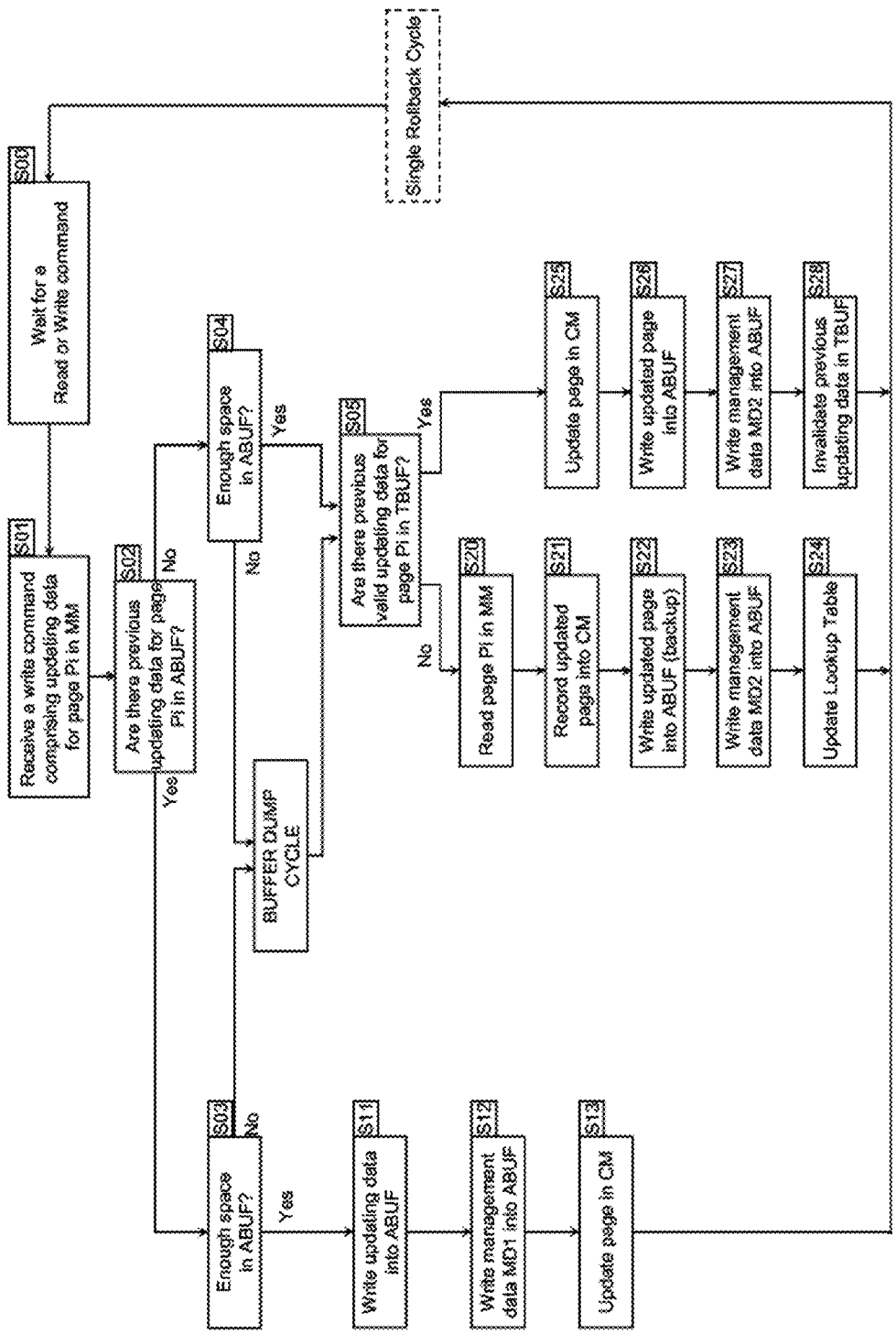
FIG. 4 is a flowchart describing a step of writing updating data in the memory device of FIG. 1 according to one embodiment of the disclosure.

FIG. 4 is a flowchart describing one embodiment of the method for writing and reading data according to the disclosure. The writing of updating data is triggered in a step S01 when the microprocessor receives from the outside a write command that includes the updating data and pointing to a specific target page Pi in the main memory MM. The command includes the address of the first word to be written and one or more words. As previously indicated, the address of the first word includes the address of page Pi and the address of the first word in the page Pi (word offset).

The core of the method includes steps S11, S12, S13 in which the microprocessor writes the updating data into the active buffer ABUF (step S11), then writes the management data of the first type MD1 (step S12) as previously described in relation with FIG. 3A, then updates the cache memory CM so that it contains the newly updated version of the target page Pi (step S13). After step S13, the microprocessor goes to a step S00 and waits for a new write command or a read command.

As previously indicated, a backup of the initial page data present in the target page Pi is also performed when updating data are received for page Pi for the first time. Therefore, the flowchart of FIG. 4 includes a first preliminary step S02 in which the microprocessor determines whether previous updating data have already been written in the active buffer ABUF for page Pi. If the response is affirmative, the microprocessor goes to a second preliminary step S03 in which it determines whether there is enough space in the active buffer ABUF for the updating data and the respective management data of the first type. If the response is affirmative, steps S11-S13 are performed. If the response is negative, the microprocessor executes a buffer dump cycle.

If the response is negative at step S02, the microprocessor goes to a third preliminary step S04 in which it determines whether there is enough space in the active buffer ABUF for the page data and the respective management data of the second type. If the response is negative, the microprocessor executes the buffer dump cycle. If the response is affirmative, the microprocessor goes to a fourth preliminary step S05 in which it determines whether there are previous valid updating data for page Pi in the transfer buffer TBUF. If the response is negative, the microprocessor executes a series of steps S20, S21, S22, S23, S24 instead of steps S11-S13 and then goes to step S00. If the response is positive, the microprocessor executes a series of steps S25, S26, S27, S28 instead of steps S11-S13 and then goes to step S00.

In step S20, the microprocessor reads the initial page data in target page Pi in the main memory. Then, the microprocessor records an updated version of the target page in the cache memory CM in step S21, writes the updated page in the active buffer ABUF in step S22, and writes the corresponding management data of the second type MD2 in step S23, as previously described in relation with FIG. 3B. Since it is the first time an updated version of page Pi has been recorded in the cache CM, the microprocessor also updates the lookup table in step S24 by recording thereinto an address pair that includes the address ADi of the target page Pi and the address ADj of the page of the cache memory in which the updated version of the target page has just been recorded. Thus, future read commands pointing to page Pi will cause the cache CM to be read instead of the main memory MM. The microprocessor then goes to step S00.

In step S25, the microprocessor updates the cache memory CM so that it contains the newly-updated version of the target page Pi. It can be noted here that the fact that valid updating data have been found in the transfer buffer TBUF means that the cache contains a previously-updated version of page Pi, so that the microprocessor has only to update again the previously-updated page data in the cache and not to record the entire updated page data in the cache. The microprocessor then writes the updated page data in the active buffer ABUF in step S26, writes the corresponding management data of the second type MD2 in the active buffer in step S27, and invalidates the previous updating data in TBUF in step S28. Such invalidation is provided to avoid the transfer of the updated page data in the cache memory into the main memory during the next buffer dump cycle. In fact, since page data for the page Pi are now present in the active buffer, the page must be considered as belonging to the active buffer and not as belonging to the transfer buffer. The microprocessor then goes to step S00.

It will be noted that the order of some steps in the flowchart may be altered according to practical implementation details. For example, step S21 was performed before steps S22-S23 and step S25 was performed before steps S26-S27 in order to utilize the cache as a volatile buffer to elaborate the updated version of the page before it is written into the active buffer. However, the microprocessor may also elaborate the updated page using its own volatile memory resources (not shown in FIG. 1) and then write the updated page into the active buffer (steps S22-S23 or S26-S27) before recording it in the cache (step S21) or before updating it in the cache (S25).

An embodiment of the buffer dump cycle is illustrated FIG. 5. The microprocessor performs steps S30, S31, S32, S33, S34, S35 then goes to step S05 previously described. In step S30, the microprocessor erases the unavailable buffer UBUF. In steps S31 to S34, the microprocessor executes a collective rollback cycle for all valid updating data present in the transfer buffer TBUF. More precisely, in step S31 the microprocessor erases in the main memory MM all target pages for which valid updating data are present in the transfer buffer TBUF. Then, in step S32, the microprocessor transfers the updated versions of these pages from the cache CM to the page location of the main memory MM that has just been erased. In step S33, the microprocessor updates the lookup table, erasing all address pairs corresponding to the pages that have just been updated in the main memory, so that these pages will be read in the main memory and not in the cache. In step S34, the microprocessor erases the updated versions of these pages in the cache CM.

Once the collective rollback cycle has been performed, the microprocessor performs a step of rotating the sectors of the nonvolatile buffer NVM (step S35): the previous active buffer ABUF becomes the current transfer buffer TBUF, the previous transfer buffer TBUF becomes the current unavailable buffer UBUF and the previous unavailable buffer UBUF (which has just been erased) become the current active buffer ABUF. It will be noted that sectors ABUF, TBUF and UBUF are physically motionless and that only the statuses allotted thereto are subject to the aforementioned rotation. These statuses are for example managed using nonvolatile status bits that are allotted to each sector of the buffer. These status bits are for example located in a "service" page (i.e., not used to store user data), for example the first page of each sector (not shown in FIG. 1). This service page is not included in the address field of the nonvolatile memory area and is accessible by means of a particular wiring or a dedicated address.

If a power interruption occurs, all updated versions of target pages in the volatile cache CM are lost and the microprocessor rebuilds the cache using the updating data and updated pages present in the nonvolatile buffer NVM. The management data MD1 and MD2 allow the microprocessor to analyze (to "parse") the updating page fragments in the nonvolatile buffer and to reconstruct the most-recent versions of updated pages.

A simplified flowchart in FIG. 6 illustrates an embodiment of the cache-reconstruction cycle and shows steps S40, S41, S42, S43, S44 performed by the microprocessor to that effect. In step S40 the microprocessor finds the buffers ABUF, TBUF and UBUF by, for example, analyzing the status bits of each sector of the nonvolatile buffer to determine which is ABUF, TBUF and UBUF. In step S41 the microprocessor analyzes the content of buffers ABUF and TBUF in order to rebuild the updated versions of the pages having valid updating data in the nonvolatile buffer. For example, the microprocessor looks for valid updated pages and valid updating data, then deduces which data are to be used to reconstruct the updated pages. If the same data of the same page Pi was updated several times and is therefore found several times in the active buffer ABUF, the updating data that was written last in the active buffer is the correct data to be used to rebuild the updated page Pi. Then, in step S42, the microprocessor records all rebuilt updated pages in the cache memory CM. In step S43, the microprocessor determines whether a buffer dump cycle was interrupted by the power interruption. If the response is affirmative, the microprocessor goes to step S44, otherwise the microprocessor ends the cache-reconstruction cycle.

There are many "clues" that can be used to implement step S43 and to determine at what instant the buffer dump cycle as shown in FIG. 5 was interrupted. For example, the microprocessor determines whether the unavailable buffer UBUF is in the erased state or not. An affirmative response means that a buffer dump cycle was begun and that step S30 was performed, but that the step S35 of rotating the sectors was not performed.

In step S44, the microprocessor first compares the content of target pages in the main memory to valid management data in the nonvolatile buffer, and determines whether the transfer step S32 was completely performed, partially performed or not at all performed. Then the microprocessor completes the buffer dump cycle. This completion may consist in performing steps S32 to S35 or merely performing step S35 if the microprocessor has determined that transfer step S32 was performed.

FIG. 7 is a flowchart showing an optional single rollback cycle that may be performed after steps S13, S24 and S28 in FIG. 4 if a predetermined condition "C" is met. Until now, the physical structure of the nonvolatile buffer has not been mentioned since it has no significance for the recording of updating data and management data in single file—when the end of a page is reached, the next updating data are written from the beginning of the next page of the active buffer. However, the fact that data have been written into a new physical page of the buffer can be used as condition "C" to perform the rollback cycle. Thus, step S50 consists of determining whether condition "C" is fulfilled. If the response is negative, the microprocessor goes directly to step S00 and does not perform the single-rollback cycle. If the response is affirmative, the microprocessor goes to step S51. In step S51, the microprocessor erases in the main memory MM the page having updating data located in the transfer buffer S51. Then, in step S52, the microprocessor transfers, from the cache CM to the page of the main memory MM that has just been erased, the updated version of this page. The microprocessor then updates the lookup table in step S53, erases the transferred updated page in the cache CM in step S54, and invalidates the corresponding updating data in the transfer buffer TBUF in step S55. Next, the microprocessor goes to the wait step S00. This single-rollback cycle simplifies and shortens the collective rollback cycle during the buffer dump cycle (steps S31 to S34).

FIGS. 8A to 8I show simplified examples of implementation of the previously-described write method.

In FIG. 8A, an initial state of the memory device is schematically shown. The main memory MM includes three target pages P1, P2, P3. For simplicity, each of these pages here includes eight words W0-W7 only. The cache memory CM includes an updated version P2'''' of page P2, which contains updated values [W0'], [W3'], [W5'], [W7'] of words W0, W3, W5, W7 present in the target page P2. In the nonvolatile buffer, the active buffer ABUF is empty and ready to receive updating data. The unavailable buffer UBUF contains data to be erased (which are represented by shadings). It can be deduced from FIG. 8A that page P2 was firstly updated with the updating data [W0'], and a first updated version P2' of page P2, including the updated data [W0'] was written in the active buffer with management data of the second type MD2, and recorded in the cache CM. Then, further write commands containing updating data [W3'], [W5'], [W7'] were successively received and the updating data were successively written in the active buffer together with their corresponding management data of the first type MD1. These updating data were also written in the cache CM which successively contained a second updated version P'' of page P2, then a third updated version P''' of page P2, then a fourth and last updated version P2'''' that can be seen in FIG. 8A. A rotation of the sectors was subsequently performed, so that the first updated version P2' of page P2 and the subsequent updating data [W3'], [W5'], [W7'] are now present in the transfer buffer and the cache memory contains the final updated version P''''.

It will be noted that the respective contents of the active, transfer and unavailable buffers in FIG. 8A to 8I are represented in a compact form, as if they were included in a single row of data, in order to simplify the drawings. For example, in FIG. 8A, the apparent space that the updated page P2' occupies in the transfer buffer is not an actual representation of the space that the page occupies in the buffer area as compared to the main memory and cache memory areas. An actual representation will show that the updated page P2' and its management data MD2 occupy more than one physical page of the transfer buffer.

Figure 8B:
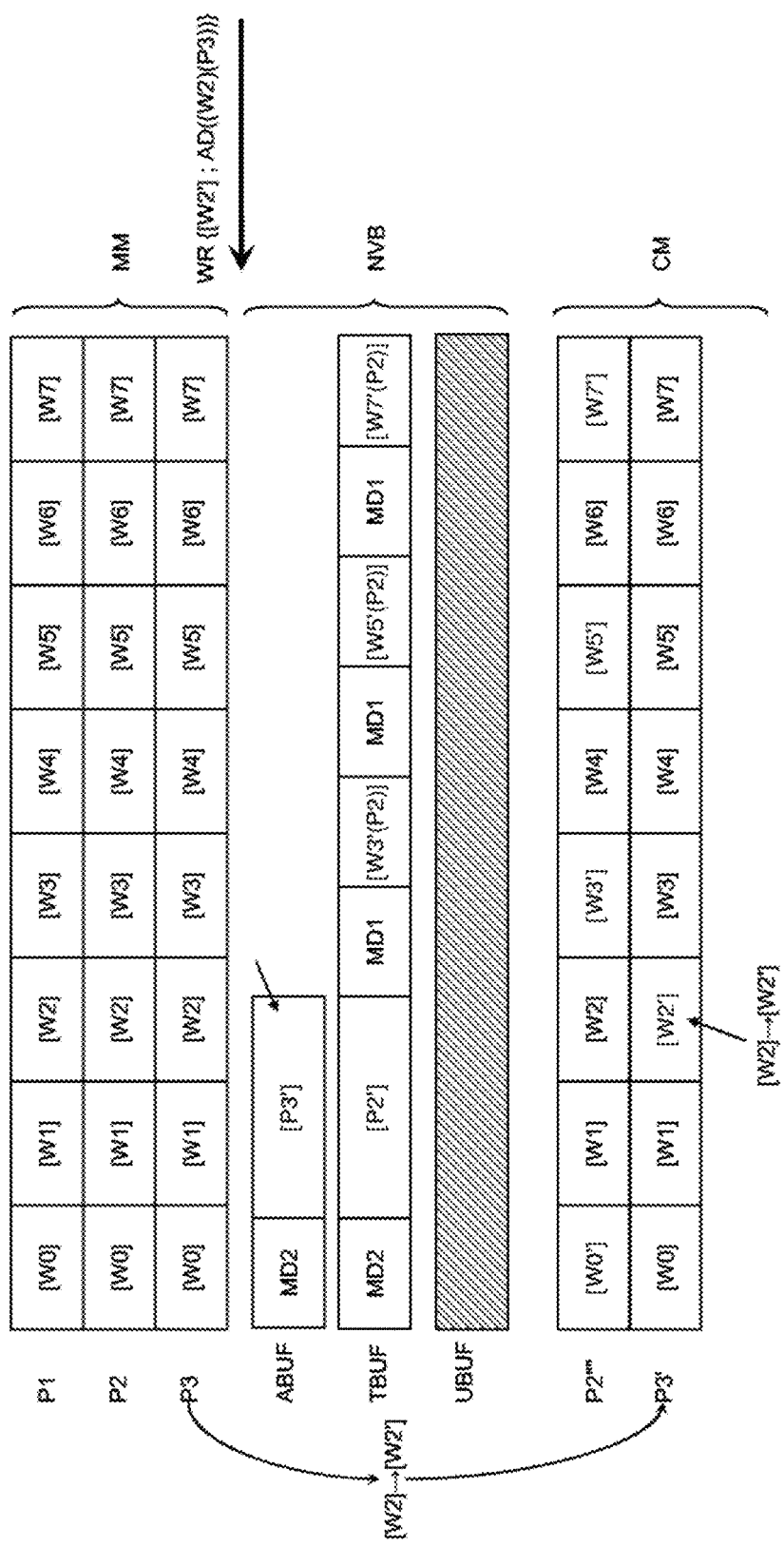
FIGS. 8A to 8I show schematically an example of implementation of some steps of the flowcharts of FIGS. 4 and 5.

In FIG. 8B, a write command WR{[W2']; AD((W2)(P3))} is sent to the microprocessor (not shown). The write command includes updating data [W2'] as well as the address of the word W2 to be updated (word offset) and the address of the target page P3. Therefore, the write command points to word W2 in target page P3 of the main memory MM. For simplicity, it is considered in this example as well as the following that only one word (here W2) is to be updated at a time. However the command may also include a series of words.

It can be seen that there are no previous updating data for page P3 in the active buffer. There are also no previous updating data for page P3 in the transfer buffer. Therefore, the target page P3 is read in the main memory and is written into the cache memory whilst incorporating the updating data [W2'] for the word W2 in the place of the initial data [W2], so that the cache CM contains an updated version P3' of page P3. Then, the updated version P3' of page P3 is written into the active buffer with corresponding management data MD2 (the management of the lookup table will not be described in this example for the sake of simplicity).

Figure 8C:
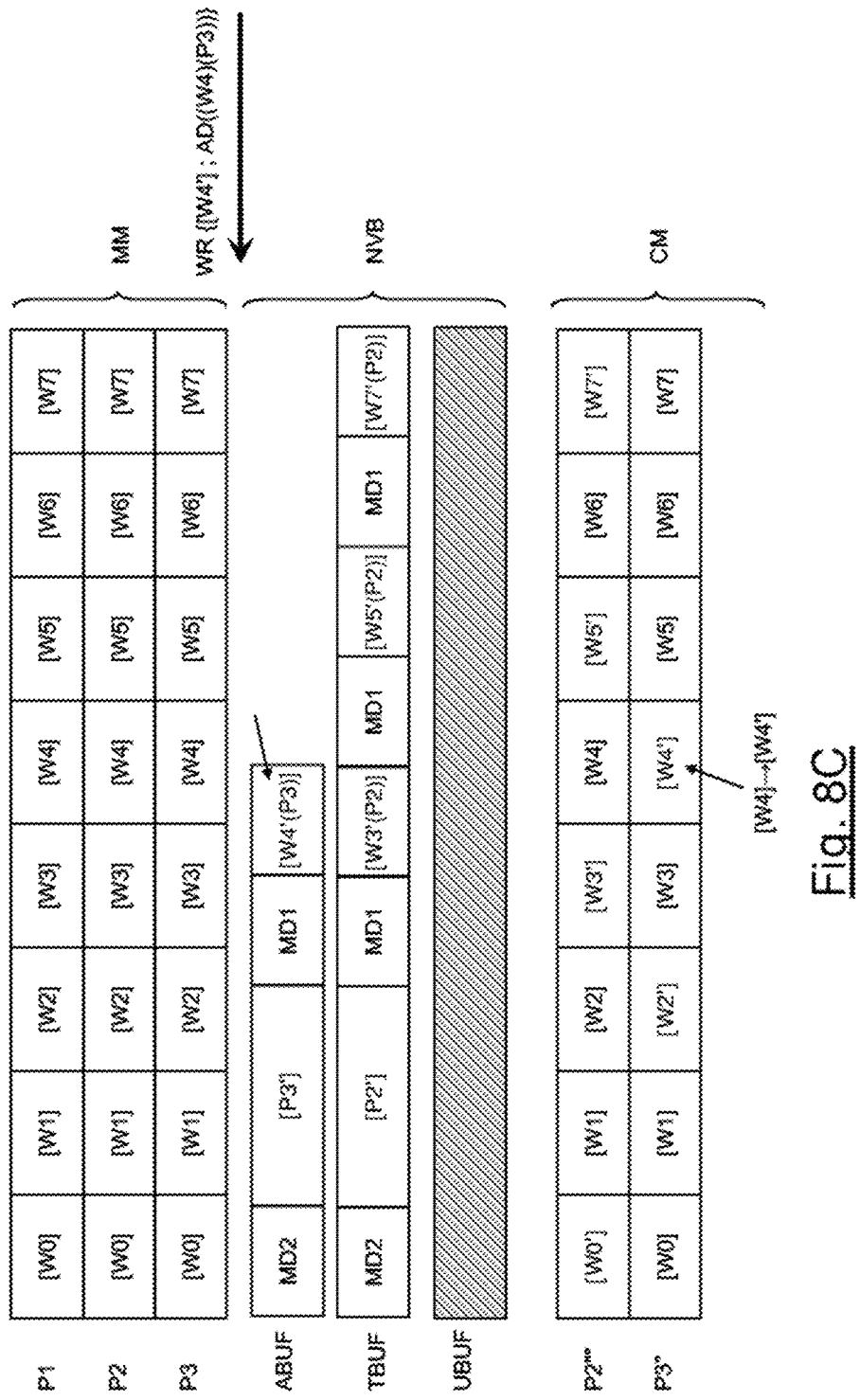
Figure 8E:
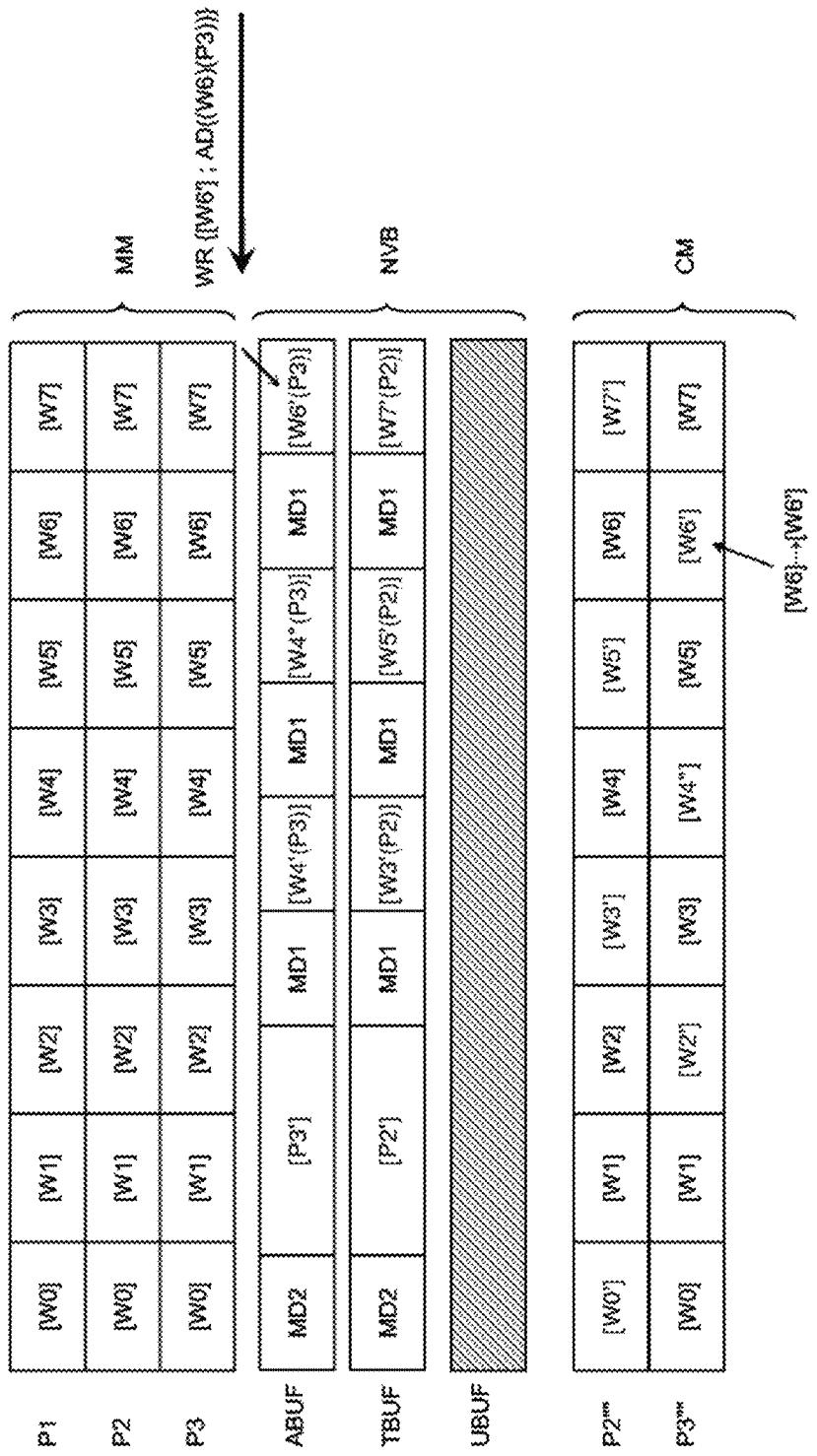

In FIG. 8C, a write command WR{[W4']; AD((W4)(P3))} is sent to the microprocessor. The write command includes updating data [W4'] and points to word W4 in page P3 of the main memory MM. Since there are already updating data for page P3 in the active buffer, the newly-updated page is not backed-up again in the nonvolatile buffer. The updating data [W4'] for the word W4 is merely written in the active buffer ABUF together with corresponding management data MD1, and the cache is updated with [W4'].

In FIG. 8D, a write command WR{[W4'']; AD((W4)(P3))} is sent to the microprocessor. The write command includes updating data [W4''] and points again to word W4 in page P3 of the main memory MM. The updating data [W4''] for the word W4 is written in the active buffer ABUF together with corresponding management data MD1, and the cache is updated with the updating data so that it contains an updated version P3''' of page P3. Therefore, one finds two different updating data for the same word W4 in the active buffer. During a cache reconstruction cycle after a power interruption, the microprocessor would consider that the value W4'' prevails over the value W4' since it was written after W4' and has valid management data MD1.

Figure 8F:
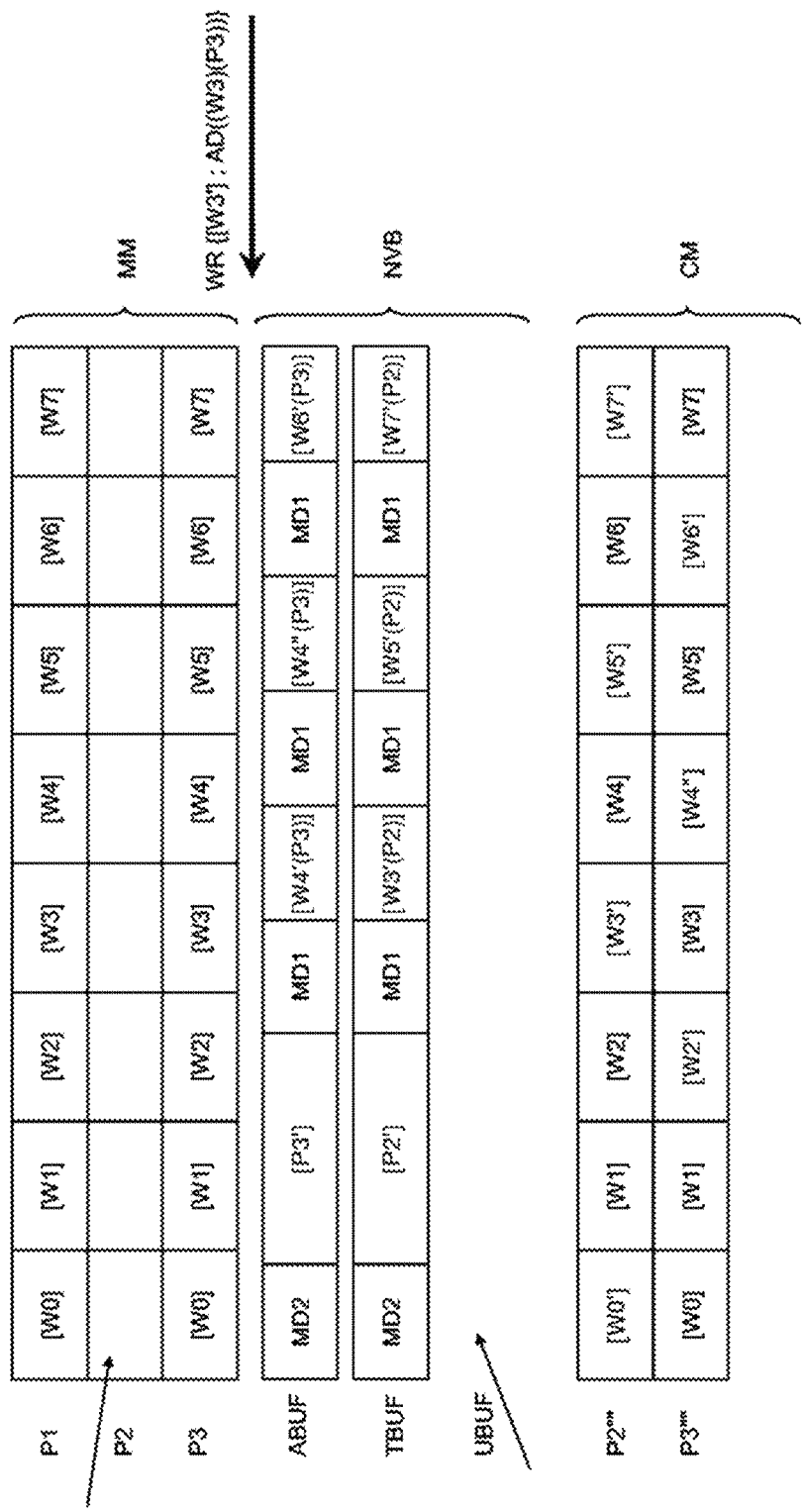

In FIG. 8F, a write command WR{[W6']; AD((W6)(P3))} is sent to the microprocessor. The updating data [W6'] for the word W6 of page P3 is written in the active buffer ABUF together with corresponding management data MD1, and the cache is updated with the updating data, so that it contains an updated version P3'''' of page P3.

In FIG. 8F, a write command WR{[W3']; AD((W3)(P3))} is sent to the microprocessor. It is assumed here that there is not enough space in the active buffer to write the updating data [W3'] and corresponding management data for word W3' of page P3. As a result, the buffer dump cycle is performed.

Figure 8G:
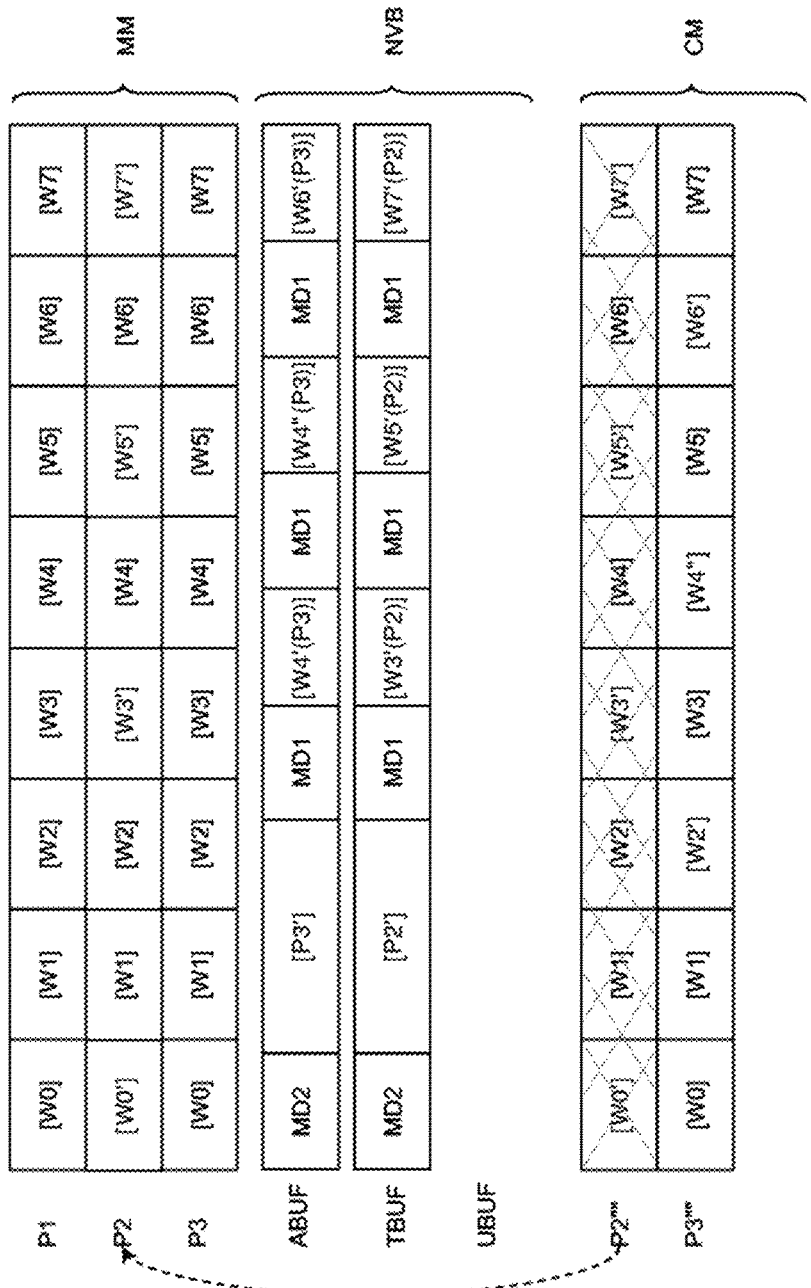

First, as shown in FIG. 8F, the unavailable buffer is erased. Then, as also shown in FIG. 8F, the initial page data of page P2 in the main memory are erased. Next, as shown in FIG. 8G, the latest updated version P2"" of page P2 (that includes the updating data [W0'], [W3'], [W5'], [W7']) is transferred from the cache CM to the page location P2 in the main memory and the updated version of page P2"" is erased in the cache memory.

Figure 8H:
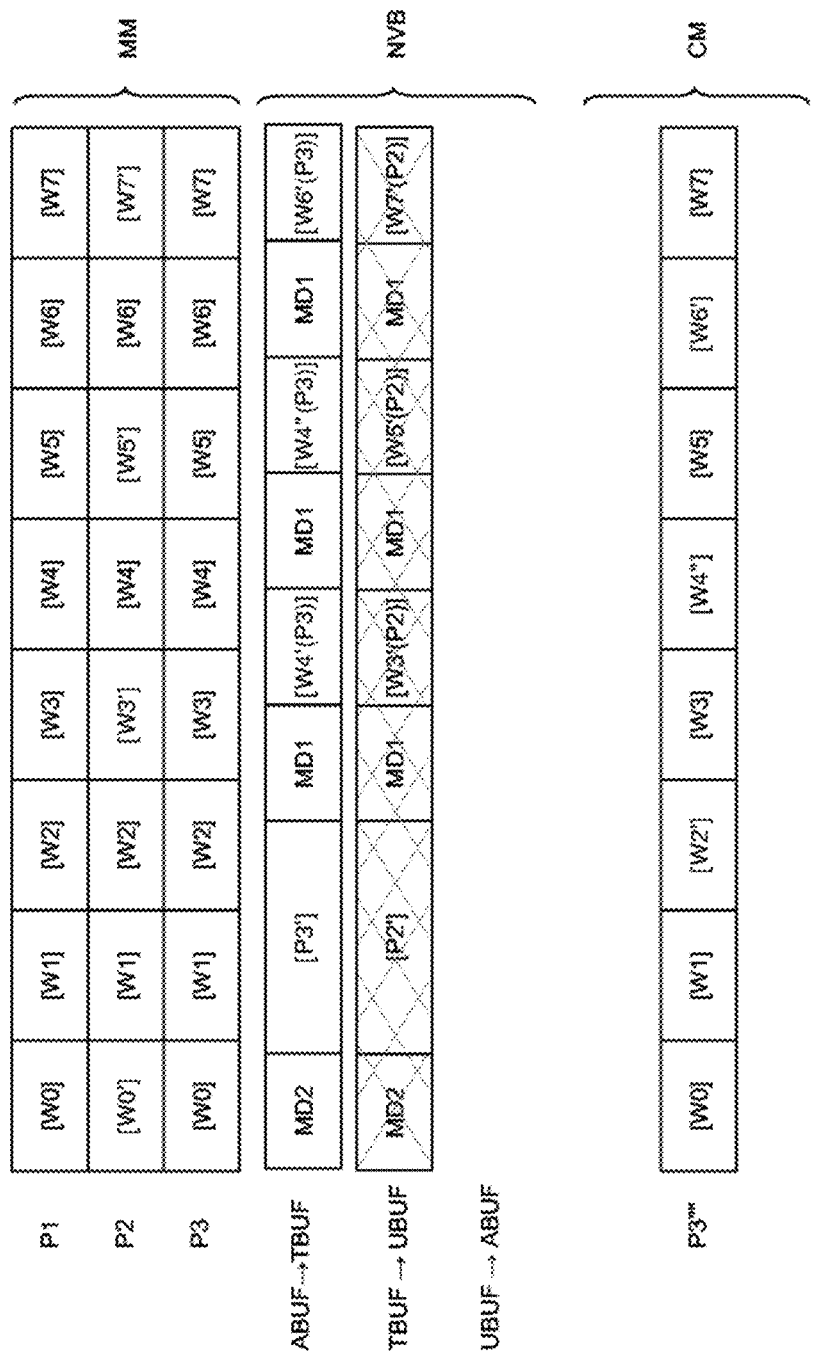
Figure 8L:
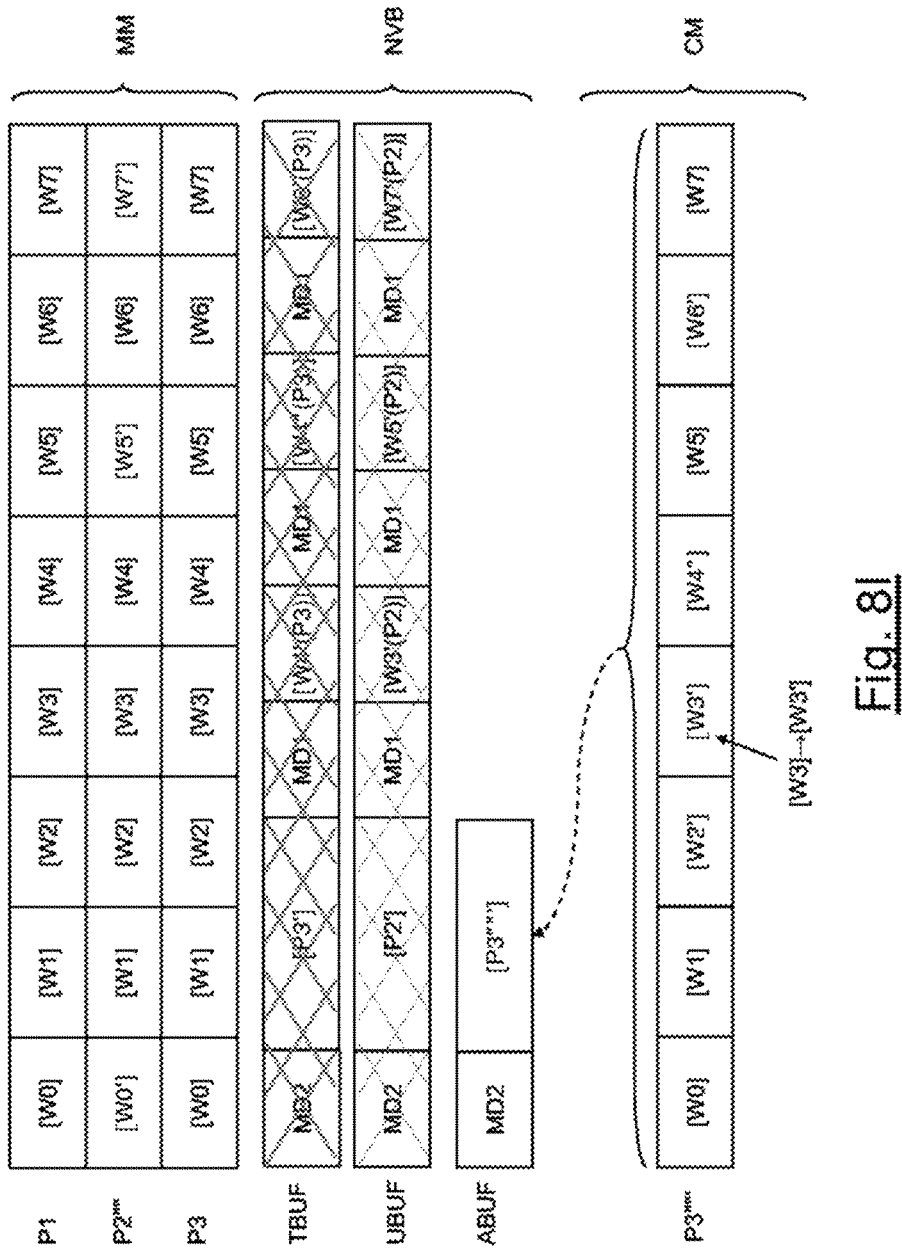

Finally, as shown in FIG. 8H, the step of rotating the three sectors of the nonvolatile buffer is performed. The previous active buffer ABUF becomes the current transfer buffer TBUF, the previous transfer buffer TBUF becomes the current unavailable buffer UBUF, and the previous unavailable buffer UBUF becomes the current active buffer ABUF. The current active buffer ABUF is therefore entirely erased and ready to receive updated page data, updating data and management data, while the current transfer buffer TBUF includes updated page data, updating data and management data that were previously written into the active buffer. The current unavailable buffer UBUF includes data which have been transferred into the main memory and are now to be erased.

After the sector rotation, and as shown in FIG. 8I, the write command can be executed. The updating data [W3'] for word W3 is recorded in the cache CM so that the latter now contains an updated version P3"" of page P3. Since there are previous updating data in the transfer buffer TBUF for the page P3, the updated version P3"" of the page is written into the active buffer ABUF and the previous backed-up page [P3'] as well as all previous updating data [W4'], [W4"] and [W6'] in the transfer buffer TBUF are invalidated so as not to be transferred into the target page location P3 of the main memory during the next step of rotating the sectors of the nonvolatile buffer.

It will be apparent to those skilled in the art that the present disclosure is susceptible of various other embodiments. In the preceding description, a "page" designates the smallest memory area that can be individually erased in a page-erasable memory. However, in embodiments of the disclosure applied to a sector erasable memory, what is called a "page" in the previous description could also be a physical sector of the nonvolatile memory. Likewise, it has been assumed that the smallest "updating data" for a page is the data element or "atomic unit of data" individually writable in the main memory by means of a programming process, for example an X-bit word. However, such smallest-writable data element could also be a page in a page-programmable and sector-erasable memory. In addition, and as indicated above, splitting the nonvolatile buffer into different sectors is merely one embodiment to ensure that the nonvolatile buffer NVB continuously has an erased area available to write updating data. Such embodiment is not obligatory for the skilled person, who may for example decide not to split the nonvolatile buffer into different sectors and to dump it when it is full.

The present disclosure is also susceptible of various applications. In particular, the memory device shown in FIG. 1 can be incorporated in a chip intended for a contact or a contactless chip card or a contactless tag.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
 receiving a write command to update a target page of a nonvolatile memory with updating data, and, in response to the write command:
  writing the updating data into an erased area of a nonvolatile buffer, together with management data of a first type that includes data indicating a location of the target page in the nonvolatile memory and data indicating a location in the target page of the updating data; and
  recording an updated version of the target page in a cache memory or updating in the cache memory a previous updated version of the target page.

2. The method of claim 1, comprising:
 receiving a page read command, and in response to the page read command:
  reading the updated version of the target page in the cache memory if the nonvolatile buffer contains updating data for the target page; or
  reading the target page in the nonvolatile memory if the nonvolatile buffer does not contain updating data for the target page.

3. The method of claim 2, comprising using a hardware lookup table to automatically select reading the updated version of the target page in the cache memory or reading the target page in the nonvolatile memory.

4. The method of claim 1 wherein the management data of the first type comprise at least one of:
 transaction data identifying a transaction in connection with which data are written;
 data identifying the management data of the first type; and
 data indicating a length of the updating data.

5. The method of claim 4 wherein the data identifying the management data of the first type or the transaction data are written after updating data and other management data have been written into the nonvolatile buffer.

6. The method of claim 4 wherein the data identifying the management data also comprise data for validating or invalidating the associated updating data.

7. The method of claim 2, comprising a page rollback cycle that includes:
 erasing, in the nonvolatile memory, at least one target page having updating data located in the nonvolatile buffer; and
 transferring an updated version of the at least one target page from the cache memory to the location of the at least one target page that has been erased in the nonvolatile memory.

8. The method of claim 2, comprising a buffer dump cycle that includes:
 erasing at least one target page in the nonvolatile memory;
 transferring an updated version of the target page from the cache memory to the location of the target page that has been erased in the nonvolatile memory; and
 erasing, in the nonvolatile buffer, updating data belonging to the transferred updated version of the target page.

9. The method of claim 8, comprising, before erasing the target page in the nonvolatile memory, backing-up in the nonvolatile buffer an initial version or an updated version of the target page in order to save initial data of the target page for which no updating data have been written or are to be written in the nonvolatile buffer.

10. The method of claim 8, further comprising, in response to the write command:
determining whether the erased area of the nonvolatile buffer is of a sufficient size to receive the updating data and the management data of the first type, then:
if the erased area of the nonvolatile buffer is of a sufficient size, writing the updating data and the management data of the first type into the erased area of the nonvolatile buffer; and
if the erased area of the nonvolatile buffer is not of a sufficient size, performing the buffer dump cycle.

11. The method of claim 1, comprising, in response to the write command, a preliminary step of determining whether the nonvolatile buffer contains previous updating data for the target page, and if the nonvolatile buffer does not contain previous updating data for the target page:
writing an updated version of the target page together with management data of a second type into the erased area of the nonvolatile buffer instead of writing the updating data and the management data of the first type thereinto, the management data of the second type including data indicating the location of the target page in the nonvolatile memory; and
recording the updated version of the target page in the cache memory.

12. The method of claim 11 wherein management data of the second type comprise at least one of:
data identifying the management data of the second type,
transaction data identifying a transaction in connection with which the updating data and the management data of the second type are written in the nonvolatile memory.

13. The method of claim 12 wherein data identifying the management data of the second type or transaction data are written after the updated version of the target page has been written into the nonvolatile buffer.

14. The method of claim 1, wherein the nonvolatile buffer includes:
an active buffer having an erased area, to write updating data and management data,
a transfer buffer configured to contain the updating data and the management data of the first type, and
an unavailable buffer configured to contain data to be erased.

15. The method of claim 8 wherein the buffer dump cycle includes:
erasing an unavailable nonvolatile buffer,
erasing, in the nonvolatile memory, target pages corresponding to valid updating data located in the transfer buffer,
transferring, from the cache memory to the locations of the target page that have been erased in the nonvolatile memory, updated versions of the target pages,
invalidating, in the transfer buffer, updating data belonging to the transferred updated versions of the target pages,
declaring as a transfer buffer a nonvolatile buffer that was previously an active buffer,
declaring as an unavailable buffer the transfer buffer that was previously the transfer buffer, and
declaring as an active buffer the unavailable buffer that was previously the unavailable buffer and that has been erased.

16. The method of claim 15, comprising, in response to the write command, at least one preliminary step of determining whether the active buffer or the transfer buffer contains previous updating data of the target page, and
if the active and transfer buffers do not contain previous updating data for the target page:
writing an updated version of the target page into the active buffer, together with management data of a second type,
recording the updated version of the target page in the cache memory, and
if the transfer buffer contains previous updating data for the target page:
writing an updated version of the page into the active buffer, together with management data of a second type,
invalidating previous updating data in the transfer buffer, and
updating in the cache memory a previously-updated version of the target page,
if the active buffer contains previous updating data for the target page:
writing the updating data into the active buffer, together with management data of the first type, and
updating in the cache memory a previously-updated version of the target page.

17. The method of claim 1, comprising a single-rollback cycle comprising:
erasing, in the nonvolatile memory, one target page having valid updating data located in the transfer buffer,
transferring, from the cache memory to the location of the target page that has just been erased, an updated version of the target page, and
invalidating, in the transfer buffer, updating data belonging to the transferred updated version of the target page.

18. The method of claim 17, comprising triggering the single-rollback cycle after updating data and management data have been written in more than one physical page of the nonvolatile buffer.

19. The method of claim 1 comprising configuring a page to be a smallest memory area of the nonvolatile memory that can be erased individually.

20. The method according to claim 1 comprising configuring an X-bit word to be a smallest updating data element that can be written in the nonvolatile memory, with "X" being less than a number of bits in a page of the nonvolatile memory.

21. A method, comprising:
initially writing updating data for a target page into an erased area of a nonvolatile buffer together with management data of a first type, which includes data indicating a location of the target page in the nonvolatile memory and data indicating a location in the target page of the updating data, in response to a write command to update the target page; and
writing an updated version of the target page having the updating data in a cache memory or updating in the cache memory a previously updated version of the target page with the updating data.

22. The method of claim 21, comprising:
writing to the nonvolatile buffer an initial version or an updated version of the target page to save initial data of the target page for which no updating data have been written or are to be written in the nonvolatile buffer;
erasing at least one target page stored in a main nonvolatile memory;

transferring an updated version of the target page from a cache memory to the location of the target page erased in the previous step from the main nonvolatile memory; and erasing in the nonvolatile buffer updating data belonging to the transferred updated version of the target page.

23. The method of claim 21, comprising, in response to the write command:

determining whether the nonvolatile buffer contains previous updating data for the target page, and if the nonvolatile buffer does not contain previous updating data for the target page:

writing an updated version of the target page together with management data of a second type into the erased area of the nonvolatile buffer, instead of writing the updating data and the management data of the first type thereinto; and recording the updated version of the target page in the cache memory.

24. The method of claim 22, comprising a buffer dump cycle that includes:

erasing an unavailable buffer, erasing, in the main nonvolatile memory, target pages corresponding to valid updating data located in the transfer buffer, transferring, from the cache memory to the locations of the target page that have just been erased in the main nonvolatile memory, updated versions of the target pages, invalidating, in the transfer buffer, updating data belonging to the transferred updated versions of the target pages, declaring as a transfer buffer an active buffer that was previously an active buffer, declaring as an unavailable buffer a transfer buffer that was previously the transfer buffer, and declaring as an active buffer an unavailable buffer that was previously the unavailable buffer and that has been erased.

25. The method of claim 24, further comprising, in response to the write command:

determining whether the erased area of the nonvolatile buffer is of a sufficient size to receive the updating data and the management data of the first type, then:

if the erased area of the nonvolatile buffer is of a sufficient size, writing the updating data and the management data of the first type into the erased area of the nonvolatile buffer; and if the erased area of the nonvolatile buffer is not of a sufficient size, performing the buffer dump cycle.

26. The method of claim 24, comprising, in response to the write command, determining whether the active buffer or the transfer buffer contains previous updating data of the target page, and if the active and transfer buffers do not contain previous updating data for the target page:

writing an updated version of the target page into the active buffer, together with management data of a second type, recording the updated version of the target page in the cache memory, and if the transfer buffer contains previous updating data for the target page:

writing an updated version of the page into the active buffer, together with management data of a second type, invalidating previous updating data in the transfer buffer, and updating in the cache memory a previously-updated version of the target page, if the active buffer contains previous updating data for the target page:

writing the updating data into the active buffer, together with management data of the first type, and updating in the cache memory a previously-updated version of the target page.

27. The method of claim 21, comprising a single-rollback cycle that includes:

erasing, in the main nonvolatile memory, one target page having valid updating data located in the transfer buffer, transferring, from the cache memory to the location of the target page that has been erased, an updated version of the target page, and invalidating, in the transfer buffer, updating data belonging to the transferred updated version of the target page.

28. A system, comprising:

a volatile cache memory;

a nonvolatile memory area having:

a main nonvolatile memory configured to store target pages; and a nonvolatile buffer having an erased area;

a microprocessor coupled to the nonvolatile memory area and to the cache memory and having a program memory configured to store instructions to be executed by the microprocessor in which the microprocessor is configured to:

write updating data into the erased area of the nonvolatile buffer together with management data of a first type that includes data indicating a location of a target page in the nonvolatile memory and data indicating a location in the target page of the updating data in response to a write command to update a target page; and write an updated version of the target page in a cache memory or update in the cache memory a previously updated version of the target page.

29. The system of claim 28, in which the microprocessor is further configured to:

write to the nonvolatile buffer an initial version or an updated version of the target page to save initial data of the target page for which no updating data has been written or is to be written in a nonvolatile buffer;

erase at least one target page stored in the main nonvolatile memory;

transfer an updated version of the target page from the cache memory to the location of the target page erased in the previous step from the main nonvolatile memory; and erase in the nonvolatile buffer updating data belonging to the transferred updated page of the target page.

30. The system of claim 29, in which the microprocessor is further configured, in response to the write command, to:

determine whether the nonvolatile buffer contains previous updating data for the target page, and if the nonvolatile buffer does not contain previous updating data for the target page:

write an updated version of the target page together with management data of a second type into the erased area of the nonvolatile buffer, instead of writing the updating data and the management data of the first type thereinto; and record the updated version of the target page in the cache memory.

31. The system of claim 29, in which the microprocessor is configured to execute a buffer dump cycle that includes:

erasing an unavailable buffer, erasing, in the main nonvolatile memory, target pages corresponding to valid updating data located in the transfer buffer, transferring, from the cache memory to the locations of the target page that have just been erased in the main nonvolatile memory, updated versions of the target pages, invalidating, in the transfer buffer, updating data belonging to the transferred updated versions of the target pages, declaring as a transfer buffer an active buffer that was previously an active buffer, declaring as an unavailable buffer a transfer buffer that was previously the transfer buffer, and declaring as an active buffer an unavailable buffer that was previously the unavailable buffer and that has been erased.

32. The system of claim 31, in which the microprocessor is further configured, in response to the write command, to:

determine whether the erased area of the nonvolatile buffer is of a sufficient size to receive the updating data and the management data of the first type, then:

if the erased area of the nonvolatile buffer is of a sufficient size, writing the updating data and the management data of the first type into the erased area of the nonvolatile buffer; and if the erased area of the nonvolatile buffer is not of a sufficient size, performing the buffer dump cycle.

33. The system of claim 31, wherein the microprocessor is further configured, in response to the write command, to:

determine whether the active buffer or the transfer buffer contains previous updating data of the target page, and if the active and transfer buffers do not contain previous updating data for the target page:

write an updated version of the target page into the active buffer, together with management data of a second type, record the updated version of the target page in the cache memory;

if the transfer buffer contains previous updating data for the target page:

write an updated version of the page into the active buffer, together with management data of a second type, invalidate previous updating data in the transfer buffer, and update in the cache memory a previously-updated version of the target page; and if the active buffer contains previous updating data for the target page:

write the updating data into the active buffer, together with management data of the first type, and update in the cache memory a previously-updated version of the target page.

34. The system of claim 31, wherein the microprocessor is further configured to execute a single-rollback cycle that includes:

erasing, in the main nonvolatile memory, one target page having valid updating data located in the transfer buffer, transferring, from the cache memory to the location of the target page that has been erased, an updated version of the target page, and invalidating, in the transfer buffer, updating data belonging to the transferred updated version of the target page.

\* \* \* \* \*